United States Patent
Kinstler

(10) Patent No.: US 6,406,100 B1
(45) Date of Patent: Jun. 18, 2002

(54) VEHICLE WHEEL COVER RETENTION SYSTEM AND METHOD FOR PRODUCING SAME

(75) Inventor: John R. Kinstler, Whitmore Lake, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/557,427

(22) Filed: Apr. 25, 2000

Related U.S. Application Data

(63) Continuation of application No. PCT/US98/23272, filed on Oct. 30, 1998.
(60) Provisional application No. 60/064,450, filed on Oct. 31, 1999.

(51) Int. Cl.$^7$ ................................................ B60B 7/00
(52) U.S. Cl. ..................................... 301/37.1; 301/37.43
(58) Field of Search ........................... 301/37.1, 37.43, 301/37.42, 37.36, 37.35, 37.23, 37.24, 37.26, 37.27, 37.37

(56) References Cited

U.S. PATENT DOCUMENTS

| | | | |
|---|---|---|---|
| 2,910,323 A | * 10/1959 | Spisak | 301/37.1 |
| 3,517,968 A | * 6/1970 | Tully et al. | 301/37.43 |
| 3,532,385 A | * 10/1970 | Foster et al. | 301/37.1 |
| 3,669,501 A | 6/1972 | Derleth | |
| 3,726,566 A | 4/1973 | Beith | |
| 3,757,400 A | * 9/1973 | Beisch | 301/37.1 |
| 3,973,801 A | * 8/1976 | Beisch et al. | 301/37.1 |
| 3,999,268 A | * 12/1976 | Jacobs | 301/37.24 |
| 4,094,550 A | * 6/1978 | Toal et al. | 301/37.1 |
| 4,530,542 A | * 7/1985 | Spiegel et al. | 301/37.43 |
| 4,606,582 A | 8/1986 | Warren | |
| 5,031,966 A | 7/1991 | Oakley | |
| 5,131,727 A | * 7/1992 | Johnson | 301/37.1 |
| 5,368,370 A | * 11/1994 | Beam | 301/37.36 |
| 5,435,631 A | * 7/1995 | Maloney et al. | 301/37.43 |
| 5,458,401 A | * 10/1995 | Baccman | 301/37.1 |
| 5,577,809 A | * 11/1996 | Chase | 301/37.43 |
| 5,595,423 A | 1/1997 | Heck et al. | |
| 5,597,213 A | * 1/1997 | Chase | 301/37.43 |
| 5,630,654 A | * 5/1997 | Chjase | 301/37.43 |
| 5,820,225 A | 10/1998 | Ferriss et al. | |
| 5,829,843 A | * 11/1998 | Eikhoff | 301/37.43 |
| 5,921,634 A | * 7/1999 | Eikhoff | 301/37.43 |
| 6,007,158 A | * 12/1999 | Maloney et al. | 301/37.43 |

FOREIGN PATENT DOCUMENTS

| | | |
|---|---|---|
| DE | 2313412 | 10/1979 |
| WO | 98/18638 | 5/1998 |

* cited by examiner

Primary Examiner—S. Joseph Morano
Assistant Examiner—Long B. Nguyen
(74) Attorney, Agent, or Firm—MacMillan, Sobanski & Todd, LLC

(57) ABSTRACT

An improved vehicle wheel cover retention system and method for producing the same includes a vehicle wheel including a disc defining an outboard facing wheel surface and including an outboard tire bead seat retaining flange. The vehicle wheel further includes a first wheel cover and a second wheel cover. The first wheel cover covers at least a portion of the outboard facing wheel surface, and the second wheel cover covers the entire portion of the outer peripheral end of the outboard tire bead seat retaining flange. Preferably, an adhesive is applied to one of the outboard facing wheel surface and the first wheel cover inner surface to permanently secure the first wheel cover and the disc together. The method for producing the vehicle wheel includes the steps: (a) providing a vehicle wheel including a disc defining an outboard facing wheel surface and including an outboard tire bead seat retaining flange; (b) providing a first wheel cover and a second wheel cover; (c) supporting the first wheel cover, the second wheel cover, and the vehicle wheel in coaxial relationship relative to one another; (d) securing the first wheel cover to the vehicle wheel, the first wheel cover covering at least a portion of the outboard facing wheel surface; and (e) securing the second wheel cover to the vehicle wheel, the second wheel cover covering the entire portion of the outboard tire bead seat retaining flange of the disc.

38 Claims, 6 Drawing Sheets

VEHICLE WHEEL COVER RETENTION SYSTEM AND METHOD FOR PRODUCING SAME

CROSS-REFERENCE TO RELATED APPLICATIONS

This application claims the benefit of U.S. Provisional Application Ser. No. 60/064,450, filed Oct. 31, 1997, and is a continuation of International Application No. PCT/US98/23272, filed Oct. 30, 1998.

BACKGROUND OF THE INVENTION

This invention relates in general to vehicle wheels and, in particular, to an improved vehicle wheel cover retention system and method for producing the same.

Full or partial vehicle wheel covers of the removable type are well known, and have been used for many years to enhance the styling of conventional, stamped wheel discs. Also, it is known to permanently secure a full or partial wheel cover to a vehicle wheel using an adhesive.

One example of a vehicle wheel with a permanently secured wheel cover is disclosed in German Patent 2,813,412. In the German Patent, the edges of the wheel cover are profiled to be clamped or hooked into fitting grooves provided on the outboard face of the wheel to secure the cover to the wheel. Additionally, the cover can also be glue-joined to the wheel.

Another example of a vehicle wheel having a permanently secured wheel cover is disclosed in U.S. Pat. No. 3,669,501 to Derleth. In the Derleth patent, a chrome-plated plastic wheel cover includes an outer peripheral flange which overhangs the outboard tire bead seat retaining flange of the wheel, an inner peripheral flange which seats against an outboard surface of a hub sleeve, and an intermediate portion which is spaced outwardly from the face of the wheel. An expanding adhesive material is applied to the outboard surfaces of the wheel. When the adhesive material is expanded, it is operative to fill the void between the wheel and the wheel cover to permanently secure the wheel cover to the outboard face of the wheel.

A further example of a vehicle wheel having a permanently secured wheel cover is disclosed in U.S. Pat. No. 5,031,966 to Oakey. In the Oakey patent, a cast aluminum wheel cover is secured to a disc of a steel wheel using a high density structural adhesive.

A yet further example of a vehicle wheel having a permanently secured wheel cover is disclosed in U.S. Pat. No. 5,368,370 to Beam. In the Beam patent, a chrome-plated stainless steel wheel cover includes an outer peripheral edge which is forced into engagement behind a catch formed in the outer rim flange to hold the wheel cover in place while an adhesive cures.

Still yet a further example of a vehicle wheel having a permanently secured wheel cover is disclosed in U.S. Pat. No. 3,726,566 to Beith. In the Beith patent, a steel, aluminum, or plastic wheel cover is secured to a wheel, and includes a terminal flange having a lip which is formed to grip the edge of the outboard tire bead seat retaining flange of the wheel.

SUMMARY OF THE INVENTION

This invention relates to an improved vehicle wheel cover retention system and method for producing the same. In particular, the vehicle wheel includes a disc defining an outboard facing wheel surface and including an outboard tire bead seat retaining flange. The vehicle wheel further includes a first wheel cover and a second wheel cover. The first wheel cover covers at least a portion of the outboard facing wheel surface, and the second wheel cover covers the entire portion of the outer peripheral end of the outboard tire bead seat retaining flange. Preferably, an adhesive is applied to one of the outboard facing wheel surface and the first wheel cover inner surface to permanently secure the first wheel cover and the disc together.

The method for producing the vehicle wheel includes the steps: (a) providing a vehicle wheel including a disc defining an outboard facing wheel surface and including an outboard tire bead seat retaining flange; (b) providing a first wheel cover and a second wheel cover; (c) supporting the first wheel cover, the second wheel cover, and the vehicle wheel in coaxial relationship relative to one another; (d) securing the first wheel cover to the vehicle wheel, the first wheel cover covering at least a portion of the outboard facing wheel surface; and (e) securing the second wheel cover to the vehicle wheel, the second wheel cover covering the entire portion of the outboard tire bead seat retaining flange of the disc.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
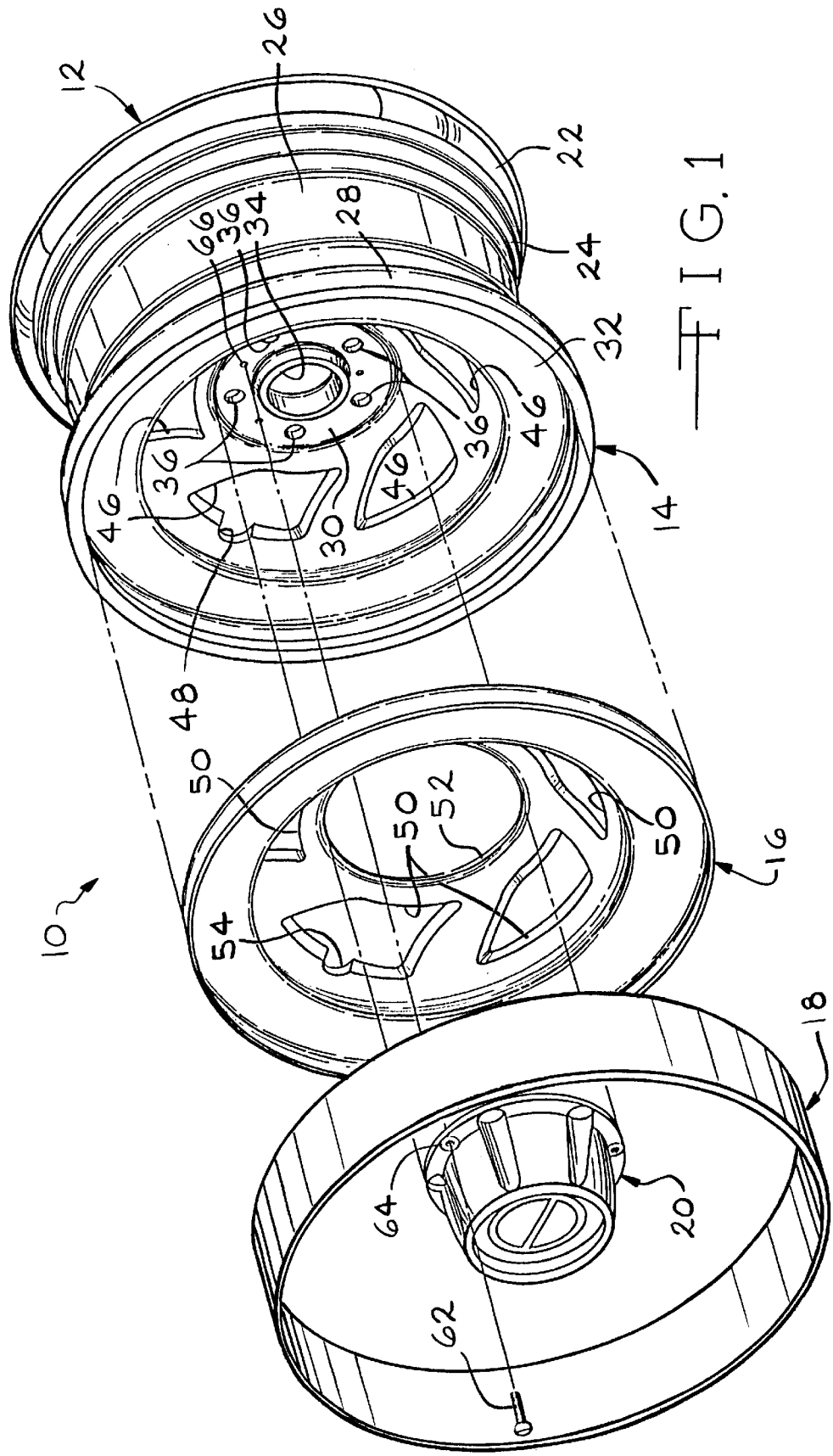
FIG. 1 is an exploded perspective view of a first embodiment of an improved vehicle wheel constructed in accordance with the present invention, and showing one piece of the two-piece wheel cover prior to subjecting such piece to a metal working process.
Figure 3:
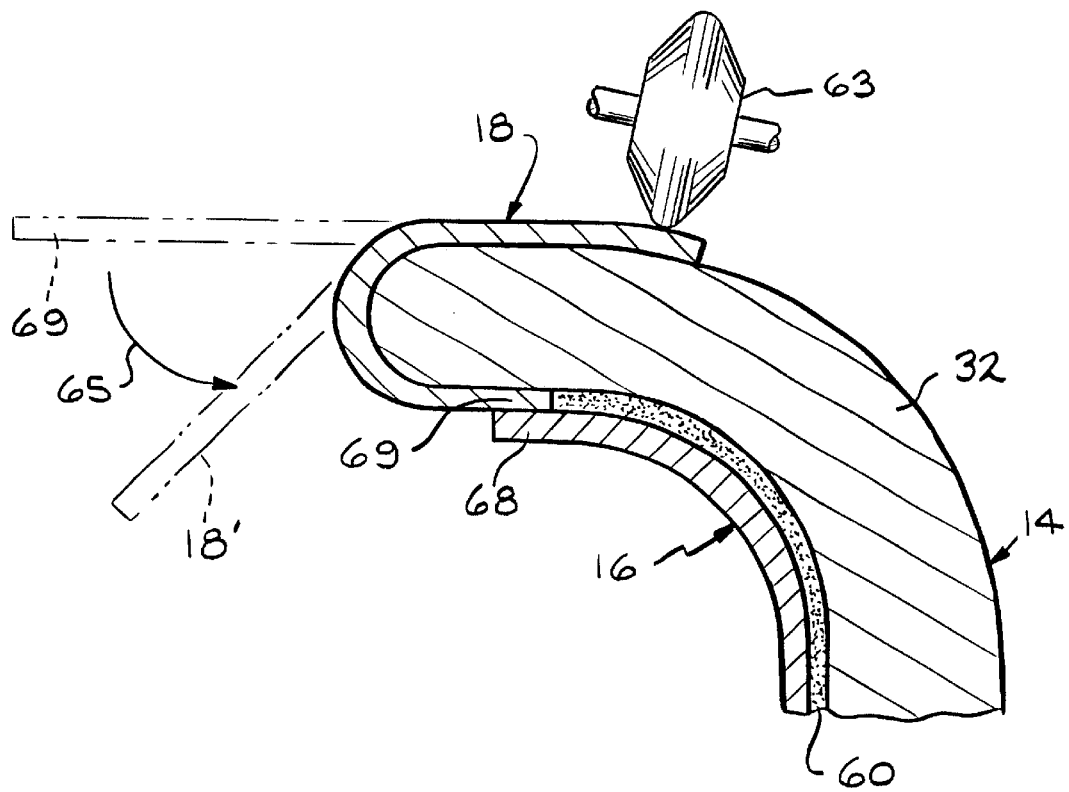
FIG. 3 is an enlarged sectional view of a portion of the vehicle wheel illustrated in FIG. 2.
Figure 4:
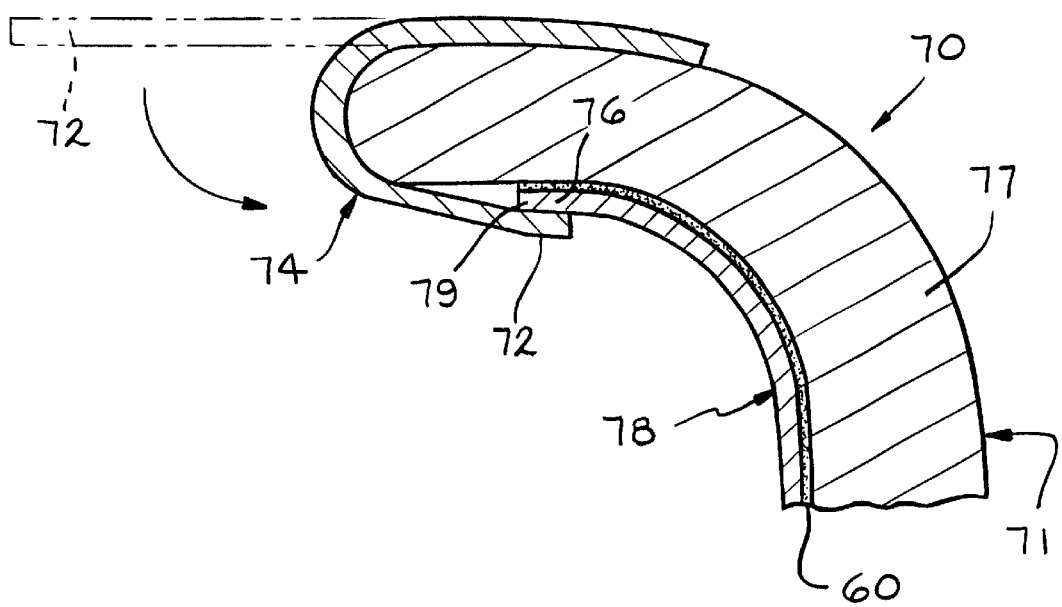
FIG. 4 is an enlarged sectional view of a second embodiment of a vehicle wheel constructed in accordance with this invention.

Referring now to the drawings, there is illustrated in FIG. 1 an exploded perspective view of an improved vehicle wheel, indicated generally at 10, in accordance with the present invention. The vehicle wheel 10 shown in this embodiment is a full face fabricated type of wheel, and includes a rim 12, a full face wheel disc 14, a first wheel cover 16, a second wheel cover 18, and a center cap 20. Although this invention is discussed in conjunction with the particular wheel disclosed herein, it will be appreciated that the invention may be used in conjunction with other types of wheel constructions. For example, the wheel can be a "bead seat attached" wheel (such as shown in FIG. 4 of U.S. Pat. No. 5,188,429 to Heck et al.), a "well attached" wheel (such as shown in FIG. 3 of Heck et al.), a "bimetal" wheel construction including an aluminum disc and a steel rim (such as shown in U.S. Pat. No. 5,421,642 to Wei et al.), or a "modular wheel" construction including a "partial" rim and a full face wheel disc (such as shown in U.S. Pat. No. 5,360,261 to Archibald et al.), the disclosures of all of these patents incorporated herein by reference.

The rim 12 is a fabricated rim constructed of steel, aluminum, or other suitable alloy materials. The rim 12 includes an inboard tire bead seat retaining flange 22, an inboard tire bead seat 24, a generally axially extending well 26, and an outboard tire bead seat 28. The rim 12 further includes an opening (not shown) formed therein to accommodate a valve stem (not shown).

The disc 14 is forged, cast, fabricated, or otherwise formed, and is constructed of steel, aluminum, or other suitable alloy materials. The disc 14 includes a generally centrally located wheel mounting surface 30, and an outer annular portion 32. The wheel mounting surface 30 is provided with a centrally located pilot aperture 34, and a plurality of lug bolt receiving holes 36 (five of such lug bolt receiving holes 36 being illustrated). The lug bolt receiving holes 36 receive lug bolts (not shown) for securing the wheel 10 on a vehicle axle (not shown).

Figure 2:
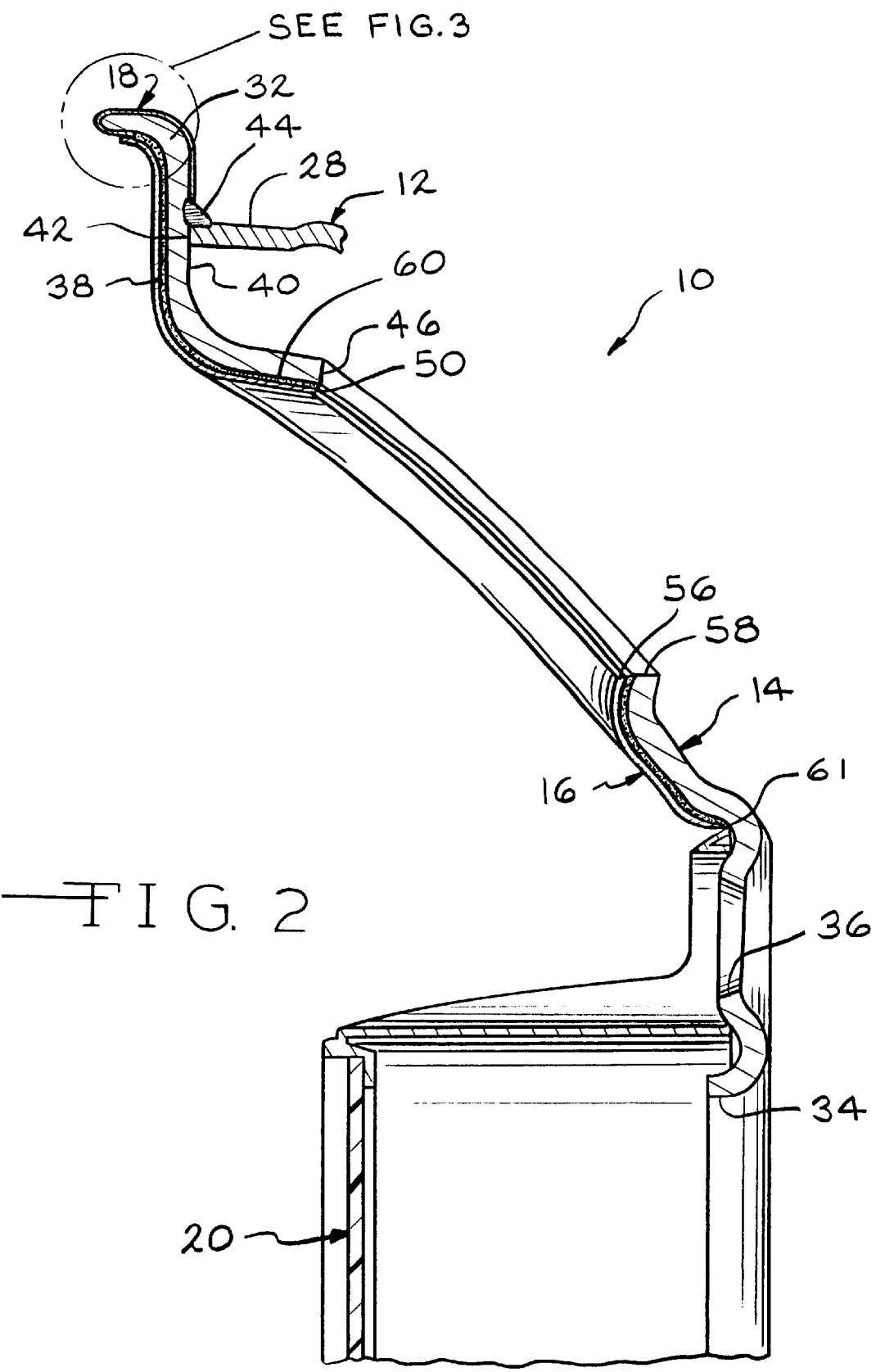
FIG. 2 is a sectional view of a portion of the vehicle wheel illustrated in FIG. 1, and showing the two-piece wheel cover in its final assembled position.

The outer annular portion 32 of the disc 14 defines an outboard tire bead seat retaining flange of the wheel 10, and includes an outer surface 38 and an inner surface 40, shown in FIG. 2. To assemble the wheel 10, an outboard end 42 of the rim 12 is positioned against the inner surface 40 of the disc 14, and a weld 44 is provided to join the disc 14 and rim 12 together as shown in FIG. 2. The disc 14 further includes a plurality of decorative windows 46 (four of such windows 46 being illustrated). As shown in this embodiment, one of the windows 46 includes a cut-out portion 48 (shown in FIG. 1), to accommodate the valve stem.

The first wheel cover 16 shown in this embodiment is preferably formed from stainless steel having a thickness of approximately 0.020 inch, and is painted or chrome-plated. The first wheel cover 16 is prefabricated to generally match the particular configuration of the outboard facing surface of the disc 14. In particular, the first wheel cover 16 includes a plurality of openings 50 which correspond to the windows 46 formed in the disc 14, and an enlarged central opening 52. One of the openings 50 includes a cut-out portion 54 which generally corresponds to the cut-out 48 provided in the one window 46 to accommodate the valve stem. The openings 50 in the first wheel cover 16 are preferably formed by a stamping operation. Also, as best shown in FIG. 2, edges 56 of the first wheel cover openings 50 preferably extend slightly past edges 58 of the windows 46 to effectively overlap the edges 58 of the windows 46. Alternatively, the first wheel cover 16 can be formed from other materials if desired. For example, the first wheel cover 16 can be formed other metals and non-metals, such as for example, from aluminum and plastic.

The second wheel cover 18 is preferably formed from stainless steel having a thickness of approximately 0.020 inch, and is painted or chrome-plated. Alternatively, the second wheel cover 18 can be formed from other materials if desired. For example, the second wheel cover 16 can be formed from other metals and non-metals, such as for example, aluminum and plastic. Preferably, the second wheel cover 18 is painted or chrome-plated to match the first wheel cover 16; however, the first wheel cover 16 and the second wheel cover 18 can have different finishes if desired.

The second wheel cover 18 covers the outboard tire bead seat retaining flange 32 of the disc 14. To accomplish this, the second wheel cover 18 (the original shape being shown in phantom in FIG. 3), is subjected to a metal forming process wherein the material of the second wheel cover 18 is engaged by a metal forming tool 63 which moves in the direction of the arrow 65 so as to engage an outer surface of the material of the second wheel cover 18 and form the material thereof around the outboard tire bead seat retaining flange 32 of the disc 14 to produce the final profile shown in FIG. 3. As shown in this embodiment, an outer portion 68 of the first wheel cover 16 is disposed adjacent and overlaps or extends over an outer portion 69 of the second wheel cover 18.

Figure 10:
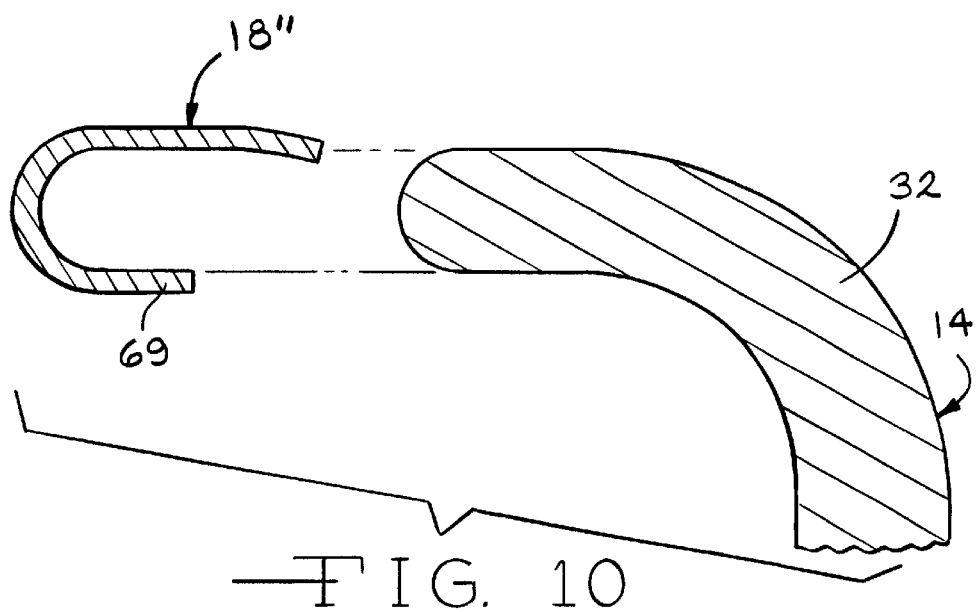
FIG. 10 is an enlarged sectional view of an eighth embodiment of a vehicle wheel constructed in accordance with this invention.

In the illustrated embodiment, the metal forming tool is a flow spinning tool 63 mounted on a support member (not shown) which allows the spinning tool 63 to generally travel parallel to the profile of the outboard tire bead seat retaining flange 32 of the disc 14. As shown in this embodiment, the spinning tool 63 is advanced in the direction of the arrow 65 to deform the material of the second wheel cover 18 around the outboard tire bead seat retaining flange 32. In the illustrated embodiment, since the second wheel cover 18 is formed from a relatively strong material, this movement does not cause a thinning of the thickness of the second wheel cover 18 but only is effective to deform the material of the second wheel cover 18 to a desired profile. Alternatively, the flow spinning operation can cause some thinning of the material of the second wheel cover 18, especially if the second wheel cover 18 is constructed of some other materials, such as for example, aluminum. Such a metal forming process can be similar to that disclosed in U.S. Pat. No. 5,595,423 to Heck et al., the disclosure of which is incorporated herein by reference. Preferably, for manufacturing purposes, the second wheel cover 18 is partially prefabricated (as shown in phantom in FIG. 3 by reference number 18'). Alternatively, the second wheel cover 18 can be fully prefabricated in such a manner so as to generally resemble the particular configuration of the outboard tire bead seat retaining flange 32 of the disc 14 so as to enable the second wheel cover 18 to be pushed onto the outboard tire bead seat retaining flange 32 and retained thereon by the "spring action" of the second wheel cover 18 (as shown in phantom in FIG. 10 by reference number 18"). Such retention of the second wheel cover 18" can be similar to that disclosed in U.S. Pat. No. 5,595,423 to Heck et al. As a result, when the first wheel cover 16 and the second wheel cover 18 which both have been chrome-plated are joined to the disc 14, the completely assembled wheel 10 of the present invention has the appearance of a "chrome-plated" wheel.

In order to permanently secure the first wheel cover 16 to the disc 12, an adhesive 60, such as a two-part epoxy, is utilized. A suitable two-part epoxy is FUSOR 380/383 manufactured by Lord Corporation. The adhesive 60 is preferably applied on the outboard face of the disc 14 in a predetermined pattern that is effective to permanently secure the first wheel cover 16 to the disc 14 and provide a seal and prevent water, mud, salt and other debris from entering between the first wheel cover 16 and the outboard facing surface of the disc 14. Alternatively, other adhesives or combinations of adhesives and/or sealants can be utilized if so desired. Also, an adhesive and/or sealant can be used to assist in securing the second wheel cover 18 to the disc 12 if desired.

As shown in this embodiment, the cap 20 is secured to the disc 14 by a plurality of fasteners 62 (only one of such fasteners 62 being illustrated). The fasteners 62 extend through openings 64 formed in the cap 20, and are received in threaded inserts 66 which are secured in openings provided in the wheel mounting surface 30 of the disc 14. An inner edge of the first wheel cover 16 can either be located outside the edge of the cap 20 (as shown in FIG. 2 at 61), or, alternatively, can extend radially inwardly under the cap 20 (not shown).

FIG. 4 illustrates a portion of a second embodiment of a vehicle wheel, indicated generally at 70, constructed in accordance with this invention. In this embodiment, an outer end 72 of a second wheel cover 74 is disposed adjacent and overlaps or extends over an outer end 76 of a first wheel cover 78, as opposed to the outer end 68 of the first wheel cover 16 extending over the outer end 69 of the second wheel cover 18 in the embodiment shown in FIGS. 1 through 3. As discussed above, to accomplish this, the second wheel cover 74 can be subjected to a metal forming process which is effective to form the material thereof around an outboard tire bead seat retaining flange 77 of a disc 71 from the original shape shown in phantom in FIG. 4 to the final shape shown therein. As a result, when the first wheel cover 78 and the second wheel cover 74 which both have been chrome-plated are joined to the disc 71, the completely assembled wheel 70 invention has the appearance of a "chrome-plated" wheel.

Figure 5:
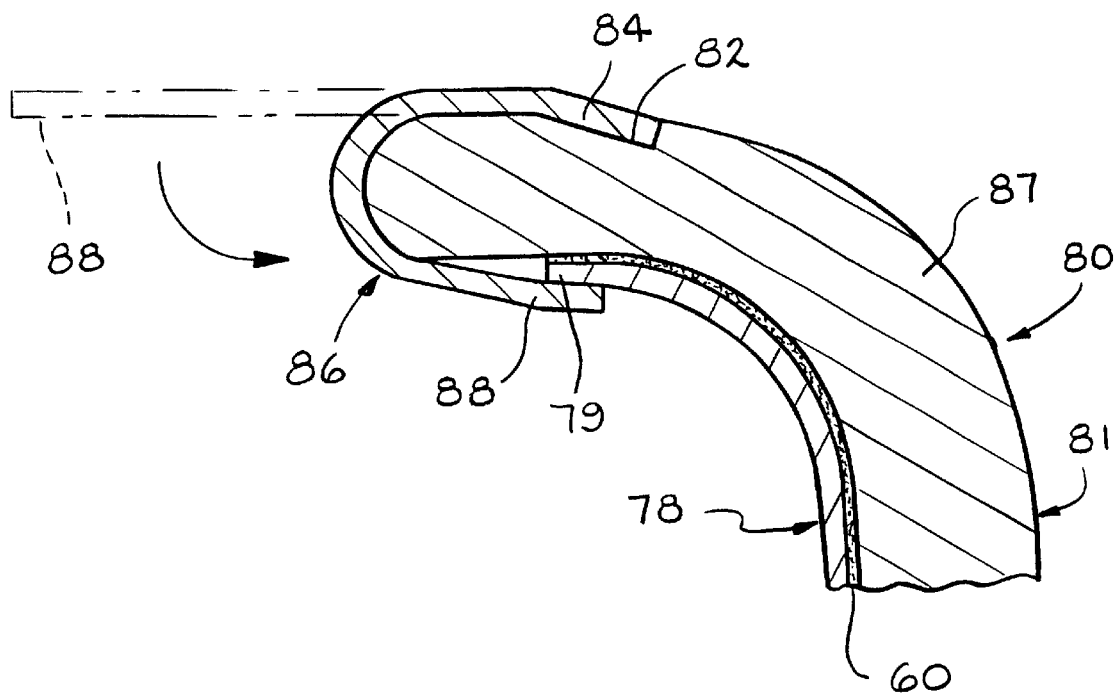
FIG. 5 is an enlarged sectional view of a third embodiment of a vehicle wheel constructed in accordance with this invention.

FIG. 5 illustrates a portion of a third embodiment of a vehicle wheel, indicated generally at 80, constructed in accordance with this invention. In this embodiment, a groove 82 is provided in an inner surface of the outboard tire bead seat retaining flange 87 of a disc 81 for receiving an inner portion 84 of a second wheel cover 86 in a manner similar to that disclosed in U.S. Pat. No. 5,595,423 to Heck et al. Preferably, the inner portion 84 of the second wheel cover 86 is partially prefabricated in such a manner so as to generally resemble the particular configuration of the groove 82. The outer end 88 of the second wheel cover 86 is subjected to a metal forming process to shape the material around the outboard tire bead seat retaining flange 87. As shown in this embodiment, the outer end 88 of the second wheel cover 86 is disposed adjacent and overlaps an outer end 79 of the first wheel cover 78.

Figure 6:
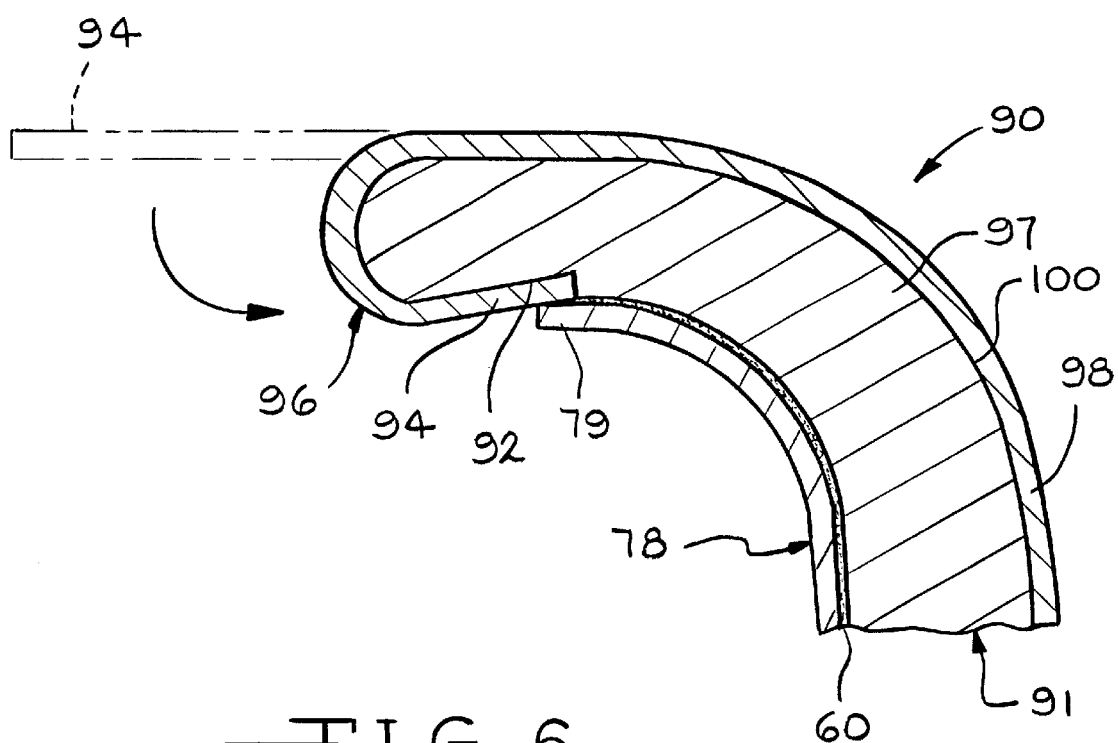
FIG. 6 is an enlarged sectional view of a fourth embodiment of a vehicle wheel constructed in accordance with this invention.

FIG. 6 illustrates a portion of a fourth embodiment of a vehicle wheel, indicated generally at 90, constructed in accordance with this invention. In this embodiment, a groove 92 is provided in an outer surface of the outboard tire bead seat retaining flange 97 of a disc 91 for receiving an outer portion 94 of a second wheel cover 96. The second wheel cover 96 further includes a prefabricated outer portion 98 which extends generally radially inwardly toward the weld (not shown) adjacent an inner surface 100 of the outboard tire bead seat retaining flange of the disc 91. The outer portion 94 is formed into the groove 92 by a flow spinning tool 93 as it moves in the direction of the arrow 95 (the original shape of the outer portion 94 of the second wheel cover 96 being shown in phantom in FIG. 6). As shown in this embodiment, the outer end 79 of the first wheel cover 78 is disposed adjacent and overlaps an outer end 94 of the second wheel cover 96.

Figure 7:
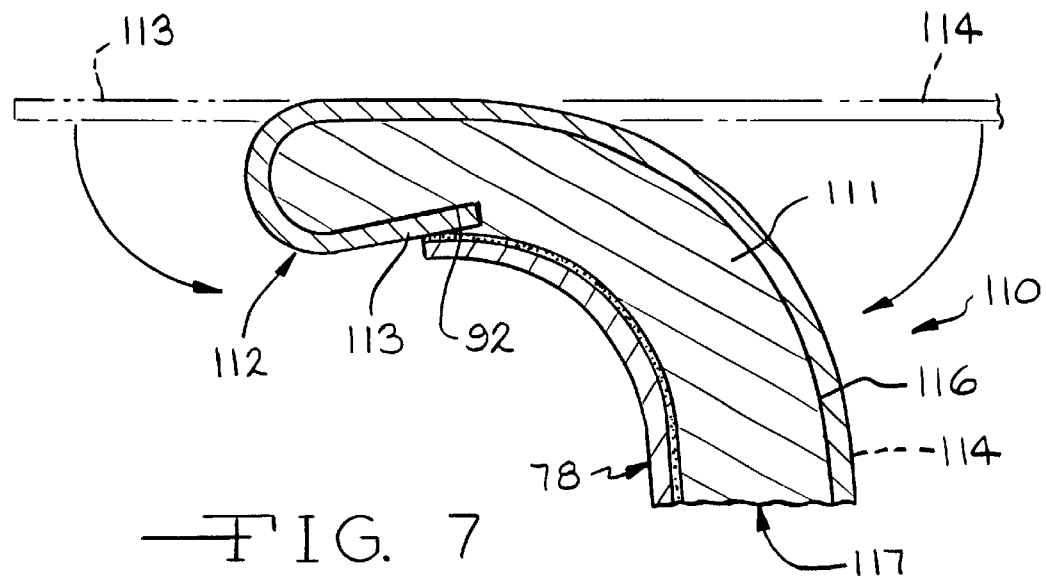
FIG. 7 is an enlarged sectional view of a fifth embodiment of a vehicle wheel constructed in accordance with this invention.

FIG. 7 illustrates a portion of a fifth embodiment of a vehicle wheel, indicated generally at 110, constructed in accordance with this invention. This embodiment is similar to the wheel 100 shown in FIG. 6 except that a second wheel cover 112 includes an inner portion 114 which is spun formed by a spinning tool 115 in the direction of arrow 117 to extend generally radially inwardly toward the weld (not shown) adjacent an inner surface 116 of the outboard tire bead seat retaining flange 111 of a disc 117, as opposed to being a preformed portion 98 as shown in FIG. 6. Also, if desired, in this embodiment, an outer portion 113 of the second wheel cover 112 can be prefabricated in such a manner so as to generally resemble the particular configuration of the groove 92 so as to enable the second wheel cover 112 to be pushed onto the flange 111 of disc 119 and retained in the groove 92 by the "spring action" of the outer portion 113 in the groove 92, prior to the flow spinning process of the inner portion 114.

Figure 8:
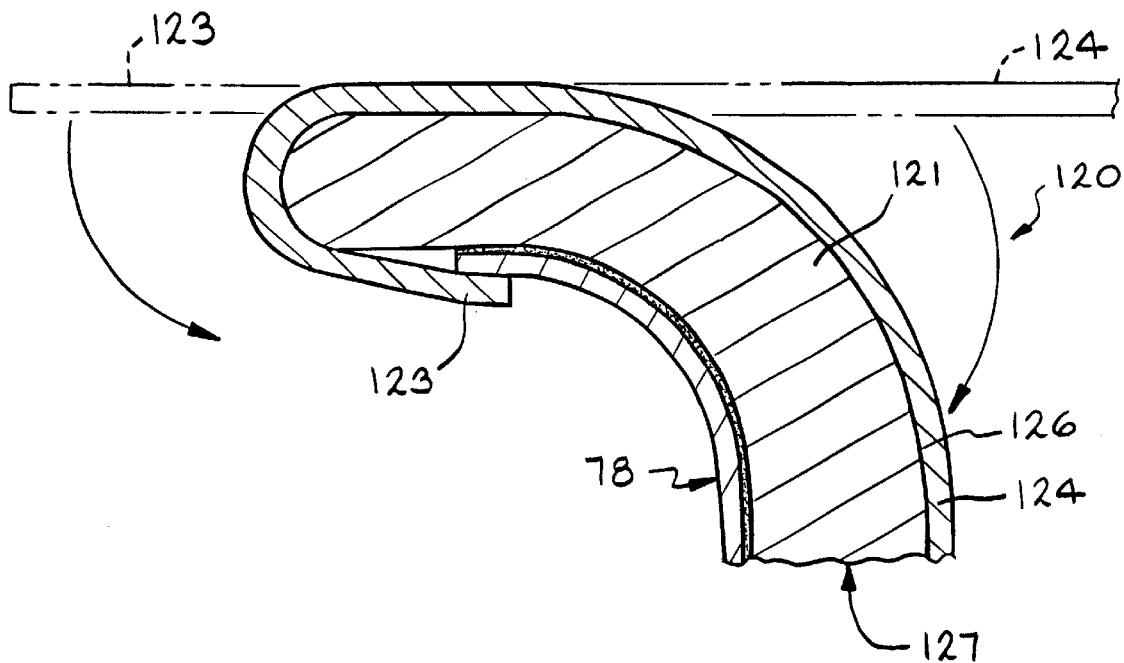
FIG. 8 is an enlarged sectional view of a sixth embodiment of a vehicle wheel constructed in accordance with this invention.

FIG. 8 illustrates a portion of a sixth embodiment of a vehicle wheel, indicated generally at 120, constructed in accordance with this invention. This embodiment is similar to the wheel 70 shown in FIG. 4 except that the second wheel cover 122 includes an extended inner portion 124 which is spun formed to extend generally radially inwardly toward the weld (not shown) adjacent an inner surface 126 of an outboard tire bead seat retaining flange 121 of a disc 127.

Figure 9:
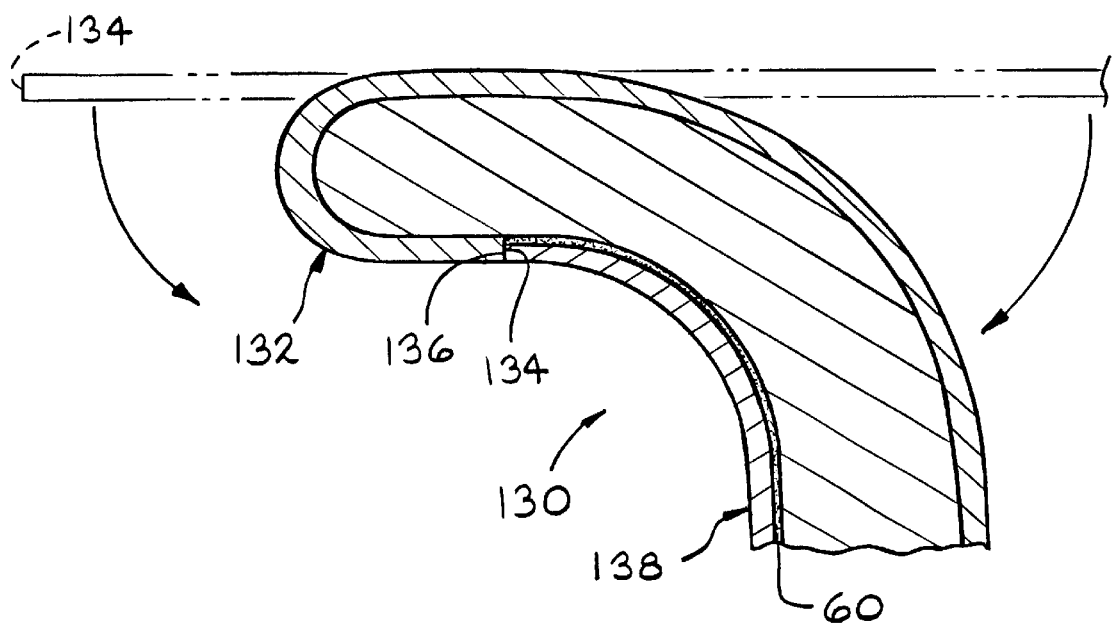
FIG. 9 is an enlarged sectional view of a seventh embodiment of a vehicle wheel constructed in accordance with this invention.

FIG. 9 illustrates a portion of a seventh embodiment of a vehicle wheel, indicated generally at 130, constructed in accordance with this invention. In this embodiment, a second wheel cover 132 includes an outermost end 134 which is disposed adjacent an outermost end 136 of a first cover 138 so as to provide a uniform transition from the outer surface of the first wheel cover 138 to the outer surface of the second wheel cover 132.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle wheel defining an axis and comprising:
    a disc defining an outboard facing wheel surface and including an outboard tire bead seat retaining flange;
    a first wheel cover secured to said disc, said first wheel cover covering at least a portion of said outboard facing wheel surface and at least a portion of said outboard tire bead seat retaining flange; and
    a second wheel cover secured to said disc, said second wheel cover covering the entire portion of said outer peripheral end of said outboard tire bead seat retaining flange.

2. The vehicle wheel according to claim 1 wherein said first wheel cover includes an outer portion, said second wheel cover includes an outer portion, and said outer portion of said first wheel cover is disposed adjacent and overlaps said outer portion of said second wheel cover.

3. The vehicle wheel according to claim 1 wherein said first wheel cover includes an outer portion, said second wheel cover includes an outer portion, and said outer portion of said second wheel cover is disposed adjacent and overlaps said outer portion of said first wheel cover.

4. The vehicle wheel according to claim 1 wherein said outboard tire bead seat retaining flange includes an outer surface having a groove formed therein, said second wheel cover includes an outer portion, and said outer portion of said second wheel cover extends into said groove when said second wheel cover is installed on said disc.

5. A vehicle wheel defining an axis and comprising:
   a disc defining an outboard facing wheel surface and including an outboard tire bead seat retaining flange;
   a first wheel cover secured to said disc, said first wheel cover covering at least a portion of said outboard facing wheel surface; and
   a second wheel cover secured to said disc, said second wheel cover covering the entire portion of said outer peripheral end of said outboard tire bead seat retaining flange;
   wherein said outboard tire bead seat retaining flange includes an inner surface having a groove formed therein, said second wheel cover includes an inner portion, and said inner portion of said second wheel cover extends into said groove when said second wheel cover is installed on said disc.

6. A vehicle wheel defining an axis and comprising:
   a disc defining an outboard facing wheel surface and including an outboard tire bead seat retaining flange;
   a first wheel cover secured to said disc, said first wheel cover covering at least a portion of said outboard facing wheel surface; and
   a second wheel cover secured to said disc, said second wheel cover covering the entire portion of said outer peripheral end of said outboard tire bead seat retaining flange;
   wherein said first wheel cover includes an outermost end, said second wheel cover includes an outermost end, and said outermost end of said second wheel cover is disposed adjacent said outermost end of said first cover.

7. The vehicle wheel according to claim 1 wherein said first wheel cover and said second wheel covered are formed of similar materials.

8. The vehicle wheel according to claim 1 wherein said first wheel cover and said second wheel cover are formed from different materials.

9. The vehicle wheel according to claim 1 wherein said vehicle wheel is a fabricated vehicle wheel.

10. A method for producing a vehicle wheel comprising the steps of:
    (a) providing a vehicle wheel including a disc defining an outboard facing wheel surface and including an outboard tire bead seat retaining flange;
    (b) providing a first wheel cover and a second wheel cover;
    (c) supporting the first wheel cover, the second wheel cover, and the vehicle wheel in coaxial relationship relative to one another;
    (d) securing the first wheel cover to the vehicle wheel, the first wheel cover covering at least a portion of the outboard facing wheel surface and at least a portion of said outboard tire bead seat retaining flange; and
    (e) securing the second wheel cover to the vehicle wheel, the second wheel cover covering the entire portion of the outboard tire bead seat retaining flange of the disc.

11. The method according to claim 10 and further includes the step of applying an adhesive to one of the outboard facing wheel surface and an inner surface of said first wheel cover, and step (d) includes selectively moving the vehicle wheel and the first wheel cover toward one another to enable the adhesive to secure the vehicle wheel and the first wheel cover together.

12. The method according to claim 10 wherein step (e) includes subjecting the second wheel cover to an operation to deform the material of the second wheel cover so as to cause the second wheel cover to cover the entire portion of the outboard tire bead seat retaining flange of the disc.

13. The method according to claim 12 wherein the second wheel cover is partially prefabricated so as to generally resemble the particular configuration of the outboard tire bead seat retaining flange of the disc.

14. The method according to claim 10 wherein the second wheel cover is prefabricated so as to generally resemble the particular configuration of the outboard tire bead seat retaining flange of the disc, and step (e) includes selectively moving the vehicle wheel and the second wheel cover toward one another so as to cause the second wheel cover to be retained thereon by the spring action of the second wheel cover on the outboard tire bead seat retaining flange of the disc.

15. The method according to claim 10 wherein the first wheel cover includes an outer portion, the second wheel cover includes an outer portion, and step (e) occurs prior to step (d) so that the outer portion of the first wheel cover is disposed adjacent and overlaps the outer portion of the second wheel cover.

16. A method for producing a vehicle wheel comprising the steps of:
    (a) providing a vehicle wheel including a disc defining an outboard facing wheel surface and including an outboard tire bead seat retaining flange;
    (b) providing a first wheel cover and a second wheel cover;
    (c) supporting the first wheel cover, the second wheel cover, and the vehicle wheel in coaxial relationship relative to one another;
    (d) securing the first wheel cover to the vehicle wheel, the first wheel cover covering at least a portion of the outboard facing wheel surface; and
    (e) securing the second wheel cover to the vehicle wheel, the second wheel cover covering the entire portion of the outboard tire bead seat retaining flange of the disc;
    wherein the first wheel cover includes an outer portion, the second wheel cover includes an outer portion, and step (d) occurs prior to step (e) so that the outer portion of the second wheel cover is disposed adjacent and overlaps the outer portion of the first wheel cover.

17. A method for producing a vehicle wheel comprising the steps of:
    (a) providing a vehicle wheel including a disc defining an outboard facing wheel surface and including an outboard tire bead seat retaining flange;
    (b) providing a first wheel cover and a second wheel cover;
    (c) supporting the first wheel cover, the second wheel cover, and the vehicle wheel in coaxial relationship relative to one another;
    (d) securing the first wheel cover to the vehicle wheel, the first wheel cover covering at least a portion of the outboard facing wheel surface; and
    (e) securing the second wheel cover to the vehicle wheel, the second wheel cover covering the entire portion of the outboard tire bead seat retaining flange of the disc;
    wherein the first wheel cover includes an outermost end, the second wheel cover includes an outermost end, and the outermost end of the second wheel cover is disposed adjacent the outermost end of the first cover when the first wheel cover and the second wheel cover are secured to the vehicle wheel.

18. The method according to claim 10 herein the first wheel cover and the second wheel covered are formed of similar materials.

19. The method according to claim 10 wherein the first wheel cover and the second wheel cover are formed from different materials.

20. The vehicle wheel according to claim 5 wherein said first wheel cover and said second wheel covered are formed of similar materials.

21. The vehicle wheel according to claim 5 wherein said first wheel cover and said second wheel cover are formed from different materials.

22. The vehicle wheel according to claim 5 wherein said vehicle wheel is a fabricated vehicle wheel.

23. The vehicle wheel according to claim 6 wherein said first wheel cover and said second wheel covered are formed of similar materials.

24. The vehicle wheel according to claim 6 wherein said first wheel cover and said second wheel cover are formed from different materials.

25. The vehicle wheel according to claim 6 wherein said vehicle wheel is a fabricated vehicle wheel.

26. The method according to claim 16 herein the first wheel cover and the second wheel covered are formed of similar materials.

27. The method according to claim 16 wherein the first wheel cover and the second wheel cover are formed from different materials.

28. The method according to claim 17 herein the first wheel cover and the second wheel covered are formed of similar materials.

29. The method according to claim 17 wherein the first wheel cover and the second wheel cover are formed from different materials.

30. A vehicle wheel defining an axis and comprising:
a disc defining an outboard facing wheel surface and including an outboard tire bead seat retaining flange;
a first wheel cover secured to said disc, said first wheel cover covering at least a portion of said outboard facing wheel surface; and
a second wheel cover secured to said disc, said second wheel cover covering the entire portion of said outer peripheral end of said outboard tire bead seat retaining flange;

wherein said first wheel cover and said second wheel cover are prefabricated so as to follow the contour of said outboard facing wheel surface.

31. The vehicle wheel according to claim 30 wherein said first wheel cover includes an outer portion, said second wheel cover includes an outer portion, and said outer portion of said first wheel cover is disposed adjacent and overlaps said outer portion of said second wheel cover.

32. The vehicle wheel according to claim 30 wherein said first wheel cover includes an outer portion, said second wheel cover includes an outer portion, and said outer portion of said second wheel cover is disposed adjacent and overlaps said outer portion of said first wheel cover.

33. The vehicle wheel according to claim 30 wherein said outboard tire bead seat retaining flange includes an outer surface having a groove formed therein, said second wheel cover includes an outer portion, and said outer portion of said second wheel cover extends into said groove when said second wheel cover is installed on said disc.

34. The vehicle wheel according to claim 30 wherein said outboard tire bead seat retaining flange includes an inner surface having a groove formed therein, said second wheel cover includes an inner portion, and said inner portion of said second wheel cover extends into said groove when said second wheel cover is installed on said disc.

35. The vehicle wheel according to claim 30 wherein said first wheel cover includes an outermost end, said second wheel cover includes an outermost end, and said outermost end of said second wheel cover is disposed adjacent said outermost end of said first cover.

36. The vehicle wheel according to claim 30 wherein said first wheel cover and said second wheel covered are formed of similar materials.

37. The vehicle wheel according to claim 30 wherein said first wheel cover and said second wheel cover are formed from different materials.

38. The vehicle wheel according to claim 30 wherein said vehicle wheel is a fabricated vehicle wheel.

* * * * *